(12) United States Patent
Kang et al.

(10) Patent No.: US 12,538,319 B2
(45) Date of Patent: Jan. 27, 2026

(54) METHODS AND APPARATUSES FOR ENHANCED CONFIGURED GRANT FOR LOW-LATENCY APPLICATIONS

(71) Applicant: Telefonaktiebolaget LM Ericsson (publ), Stockholm (SE)

(72) Inventors: Du Ho Kang, Sollentuna (SE); Jose Luis Pradas, Stockholm (SE); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 18/033,127

(22) PCT Filed: Oct. 22, 2021

(86) PCT No.: PCT/EP2021/079389
§ 371 (c)(1),
(2) Date: Apr. 21, 2023

(87) PCT Pub. No.: WO2022/084525
PCT Pub. Date: Apr. 28, 2022

(65) Prior Publication Data
US 2023/0397216 A1    Dec. 7, 2023

Related U.S. Application Data

(60) Provisional application No. 63/104,805, filed on Oct. 23, 2020.

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .......................... H04W 72/23; H04W 72/1268
(Continued)

(56) References Cited

U.S. PATENT DOCUMENTS

2014/0373024 A1 * 12/2014 Watts .................... G06F 9/5094
                                                                  718/104
2016/0088627 A1 *  3/2016 Tayrac .............. H04B 7/18539
                                                                  370/319

(Continued)

FOREIGN PATENT DOCUMENTS

EP          3611866 A1 *  2/2020  .......... H04B 17/318
WO     2020/204533 A1    10/2020

OTHER PUBLICATIONS

International Search Report and the Written Opinion of the International Searching Authority, issued in corresponding International Application No. PCT/EP2021/079389, dated Feb. 7, 2022, 11 pages.

(Continued)

*Primary Examiner* — Peter G Solinsky
(74) *Attorney, Agent, or Firm* — Rothwell, Figg, Ernst & Manbeck, P.C.

(57) ABSTRACT

Methods and devices for resource allocation in low-latency high-rate applications. In one embodiment a method (700, 800) is performed in a user equipment, UE (401, 402). The method comprising: receiving (710, 810) a configuration for an initial configured grant for uplink transmission on periodic transmission resources comprising at least one uplink slot; and transmitting (720) data on at least one uplink slot of the initial configured grant, wherein the uplink resource allocation to the UE is dynamically adaptable based at least in part on the initial configured grant being insufficient for uplink transmission or the actual data size for transmission being smaller than the initial configured grant.

27 Claims, 17 Drawing Sheets

950 configuring a UE for one or more configured grants, wherein the configuring comprises specifying a time window for at least one of the configured grants    s960 sending an activation (or deactivation) for the configured grant, where the activation (or deactivation) is valid for the specified time window    s970

(58) Field of Classification Search
USPC ......................................................... 370/329
See application file for complete search history.

(56) References Cited

U.S. PATENT DOCUMENTS

| | | | |
|---|---|---|---|
| 2016/0253339 A1* | 9/2016 | Ambrose | G06F 3/0647 |
| | | | 707/693 |
| 2019/0029033 A1* | 1/2019 | Tang | H04W 28/0278 |
| 2019/0268927 A1* | 8/2019 | Dudda | H04W 72/23 |
| 2020/0267755 A1 | 8/2020 | Ugurlu et al. | |
| 2021/0167930 A1* | 6/2021 | Jeon | H04B 7/0626 |

OTHER PUBLICATIONS

Ericsson, 3GPP TSG-RAN WG2 #105 Tdoc R2-1901300, "On support of Intra-UE UL Mixed Services", Athens, Greece, Feb. 25-Mar. 1, 2019, 6 pages.

3GPP TS 38.214 V16.0.0 (Dec. 2019), "3rd Generation Partnership Project; Technical Specification Group Radio Access Network; NR; Physical layer procedures for data (Release 16)", Dec. 2019, 147 pages.

Qualcomm, 3GPP TSG RAN Meeting #86 RP-193241 "New SID on XR Evaluations for NR", Sitges, Spain, Dec. 9-12, 2019, 6 pages.

\* cited by examiner

| List Entry Index | Time Domain Resource Allocation |
|---|---|
| 0 | ... |
| 1 | ... |
| ... | ... |
| n | $(K_2[n][0], S[n][0], L[n][0]), (K_2[n][1], S[n][1], L[n][1]), ..., (K_2[n][m], S[n][m], L[n][m]), ...,$ $(K_2[n][M_n], S[n][M_n], L[n][M_n])$ |
| n+1 | ... |
| ... | ... |
| N-1 | ... |

1150

METHODS AND APPARATUSES FOR ENHANCED CONFIGURED GRANT FOR LOW-LATENCY APPLICATIONS

TECHNICAL FIELD

Disclosed are embodiments related to configured grant radio resource allocation, and in particular, allocation for low-latency high-rate applications.

BACKGROUND 5G is the fifth generation of mobile communications, addressing a wide range of use cases, including enhanced mobile broadband (eMBB), ultra-reliable low-latency communications (URLLC), and massive machine type communications (mMTC). 5G includes the New Radio (NR) access stratum interface and the 5G Core Network (5GC). The NR physical and higher layers may reuse parts of the LTE specification, with added functionality and components as needed, for instance, by new use cases.

Low-latency high-rate applications such as eXtended Reality (XR) and cloud gaming are important in the 5G era. XR may refer, generally, to all real-and-virtual combined environments and human-machine interactions generatd by computer technology and wearables. In this respect, it can be an umbrella term for different types of realities including Virtual reality (VR), Augmented reality (AR), Mixed reality (MR), and the areas interpolated among them. How "virtual" a reality may be can range, for example, from partially sensory inputs to fully immersive VR.

In certain respects, 5G NR is being designed to support applications demanding high rate and low latency in line with the requirements posed by the support of XR and cloud gaming applications in NR networks. For example, 3GPP Release 17 contains a study item on XR Evaluations for NR at RP-193241, "New SID on XR Evaluations for NR." The main objectives are to identify the traffic model for each application of interest, the evaluation methodology and the key performance indicators of interest for relevant deployment scenarios, and to carry out performance evaluations accordingly in order to investigate possible standardization enhancements.

There is a need for enhanced resource allocations, including for low-latency high-rate applications such as XR and cloud gaming.

SUMMARY

Certain challenges exist. For example, given the variability of one or more factors, such as rate and latency requirements in various applications, a particular radio resource allocation may be inefficiently configured or used. This can lead to instances where a granted resource may not be necessary, and is thus wasted. As another example, a grant may be insufficient, which may require the allocation of additional resources. Moreover, there may be challenges in addressing these issues without substantially increasing signaling overhead.

Accordingly, in some embodiments, a method performed in a user equipment (UE) is provided that comprises: receiving a configuration for an initial configured grant for uplink transmission on periodic transmission resources comprising at least one uplink slot; and transmitting data on at least one uplink slot of the initial configured grant, wherein the uplink resource allocation to the UE is dynamically adaptable based at least in part on the initial configured grant being insufficient for uplink transmission or the actual data size for transmission being smaller than the initial configured grant.

According to embodiments, a method in a radio access network node is provided that comprises configuring a UE for an initial configured grant for uplink transmission on periodic transmission resources comprising at least one uplink slot; and receiving data from the UE on at least one uplink slot of the initial configured grant, wherein the uplink resource allocation to the UE is dynamically adaptable based at least in part on the initial configured grant being insufficient for uplink transmission or the actual data size for transmission being smaller than the initial configured grant.

According to embodiments, a method in a user equipment (UE) is provided that comprises: receiving from a node a configured grant for uplink transmissions, where the configured grant comprises a plurality of uplink slots (e.g., on Physical Uplink Shared Channel (PUSCH)); signaling to the node that at least one of the plurality of granted uplink slots is not needed by the UE; and starting a transmission timer. In some embodiments, the method includes transmitting data on a first uplink slot of the configured grant before starting the timer. The transmission timer may be started when no data remains for uplink transmission during the configured grant occasion. This may be, for example, when the buffers for all logical channels that are allowed to use or transmit on the configured grant are empty. In some embodiments, the node is a gNB.

According to embodiments, a method in a node is provided that comprises: sending a configured grant for uplink transmissions to a first UE, where the configured grant comprises a plurality of uplink slots (e.g., PUSCH); receiving from the first UE an indication that at least one of the plurality of granted uplink slots is not needed; and initiating a resource reuse estimation for at least one unused uplink slot of the configured grant.

According to embodiments, a method in a UE is provided that comprises receiving an initial configured grant comprising at least one uplink slot. After receiving the initial configured grant, the UE receives a dynamic grant that allocates a plurality of additional uplink slots, where at least two of the plurality of additional uplink slots are non-consecutive slots. In certain aspects, the initial configured grant is insufficient for uplink transmission (e.g., due to variable file size).

According to embodiments, a method in a node is provided that comprises sending, to a UE, an initial configured grant comprising at least one uplink slot. After sending the initial configured grant, the node sends a dynamic grant that allocates a plurality of additional uplink slots to the UE, where at least two of the plurality of additional uplink slots are non-consecutive slots.

According to embodiments, a method in a UE is provided that comprises: receiving an activation (or deactivation) for a configured grant, such as an allocation of periodic uplink slots. In certain aspects, the activation (or deactivation) is valid for a specified time window. The method may further comprise deactivating (e.g., ceasing), or reactivating, the configured grant once the specified time window is passed or otherwise expired.

According to embodiments, a method in a node is provided that comprises: configuring a UE for one or more configured grants, wherein the configuring comprises specifying a time window for at least one of the configured grants; and sending an activation (or deactivation) for the configured grant (e.g., an allocation of periodic uplink slots), wherein the activation (or deactivation) is valid for the specified time window.

According to embodiments, a method is performed in a UE that comprises: receiving, from a node, a time domain resource allocation list comprising a plurality of entries; receiving an indication identifying one or more entries in the list; and activating a configured grant having at least two uplink allocations (e.g., PUSCH allocations) in the period of the configured grant based on the received indication. In some embodiments, the list comprises a first subset of entries used to schedule single-PUSCH and a second subset of entries used to schedule multi-PUSCH. In embodiments, the received indication is via Downlink Control Information (DCI) and the allocation list is received via Radio Resource Control (RRC).

According to embodiments, a method in a node is provided that comprises: sending a UE a time domain resource allocation list comprising a plurality of entries; and sending an indication (e.g., DCI) identifying one or more entries in the list, wherein the DCI activates a configured grant having at least two uplink allocations in the period of the configured grant based on the indication. The allocation may be, for instance, PUSCH allocations.

According to embodiments, an apparatus, such as a UE or node (e.g., gNB), is provided that is configured to perform one or more of the methods. For example, an apparatus may comprise a receiver/transmitter and a processor, wherein the processor is configured to perform one or more of the methods.

According to embodiments, a computer program is provided that comprises instructions that when executed by processing circuitry of an apparatus causes the apparatus to perform one or more of the methods. The program can be contained on a carrier, where the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

In certain aspects, embodiments disclose methods and devices that can allow fast and adaptive resource allocation when a baseline semi-persistent scheduling (SPS) or configured grant is applied for periodic XR traffic with varying size. Aspects may include, for instance: (1) defining a UE procedure when the granted resource is larger than actually needed; and (2) allowing non-consecutive extra multi-slot allocations with minimal Physical Downlink Control Channel (PDCCH) overhead when the granted resource is smaller than is actual needed. Embodiments can minimize signaling overhead and related latency when re-allocating unused granted resource to other users.

Low-latency applications like XR and cloud gaming often require bounded latency, not necessarily ultra-low latency. The end-to-end latency budget may be in the range of 20-80 ms, for instance, which needs to be distributed over several components including application processing latency, transport latency, radio link latency, etc. For these applications, short transmission time intervals (TTIs) or mini-slots targeting ultra-low latency may not be effective. Frame latency can be measured over a radio access network (RAN), in some cases excluding application & core network latencies. In these measurements, there can be frame latency spikes in RAN, for instance, due to instantaneous shortage of radio resources or inefficient radio resource allocation in response to varying frame size. The sources for the latency spikes may include queuing delay, time-varying radio environments, and time-varying frame sizes, among others. Tools that can help to remove latency spikes are beneficial to enable better 5G support for this type of traffic.

In addition to bounded latency requirements, applications like XR and cloud gaming also require high rate transmission, as illustrated by the large frame sizes originating from this type of traffic. For example, the typical frame sizes may range from tens of kilobytes to hundreds of kilobytes. The frame arrival rates may be 60 or 120 frames per second (fps). A frame size of 100 kilobytes and a frame arrival rate of 120 fps can lead to a rate requirement of 95.8 Mbps, in some instances. A large video frame is usually fragmented into smaller IP packets and transmitted as several transport blocks (TBs) over several TTIs in RAN.

Figure 1:
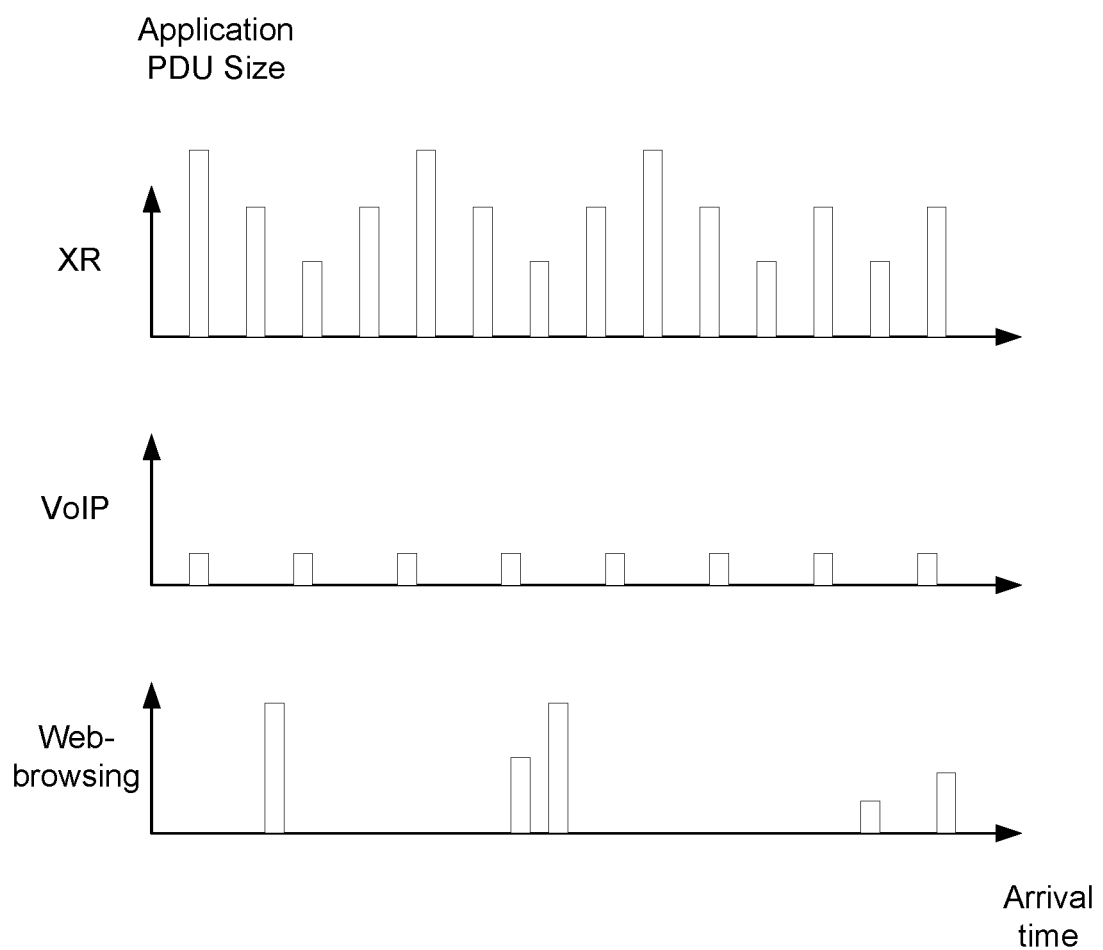
FIG. 1 illustrates an example of XR, VoIP, and web-browsing traffic characteristics.

The characteristics of XR traffic arrival are usually different than typical web-browsing and VoIP traffic, as shown in the example of FIG. 1. It is typically expected that the arrival time is quasi-periodic and largely predictable, much like VoIP. However, the data size for XR is frequently an order of magnitude larger than VoIP. In addition, similar to web-browsing, the data size for XR is often different at every application PDU arrival instance due to dynamics of its content and human motion.

In some embodiments, uplink (UL) resource allocation is provided for uplink transmission with a configured grant, and downlink (DL) resource allocation are provided for downlink transmission with semi-persistent scheduling (SPS). In cellular wireless systems, such as the LTE and NR standards in 3GPP, resources for UL/DL transmissions are configured and scheduled by a network node (e.g., an eNB or gNB). This can be done dynamically, where the eNB/gNB schedules the transmission per transmission occasion which can be a transmission time interval (TTI) or multiple TTIs.

Besides dynamic scheduling, DL transmission can be higher layer configured using the SPS framework, in which multiple periodic resources are granted at the same time (i.e. prior to a data transmission). Configuration of SPS includes periodicity of the grant, resource allocation in time and frequency and modulation and coding scheme (MCS) in SPS occasions, and others. Similarly, UL transmission resources can be allocated prior to transmission and scheduled in advance (e.g., periodic allocations) according to embodiments, for instance, on reserved resources that can be directly utilized by a UE when activated. Such allocations can be referred to as a configured grant, UL transmission without grant, or grant-free transmission. Two types of UL transmission with configured grant are specified. In type 1 UL transmission with configured grant, resource allocation is only based on RRC (re)configuration, while L1 signaling is only used to activate/deactivate the configuration (similar to DL SPS). In type 2 UL transmission with configured grant, resource allocation is partly determined by Radio Resource Control (RRC) (re)configuration, and partly determined by L1 signaling used for activating/deactivating the configuration.

Figure 2:
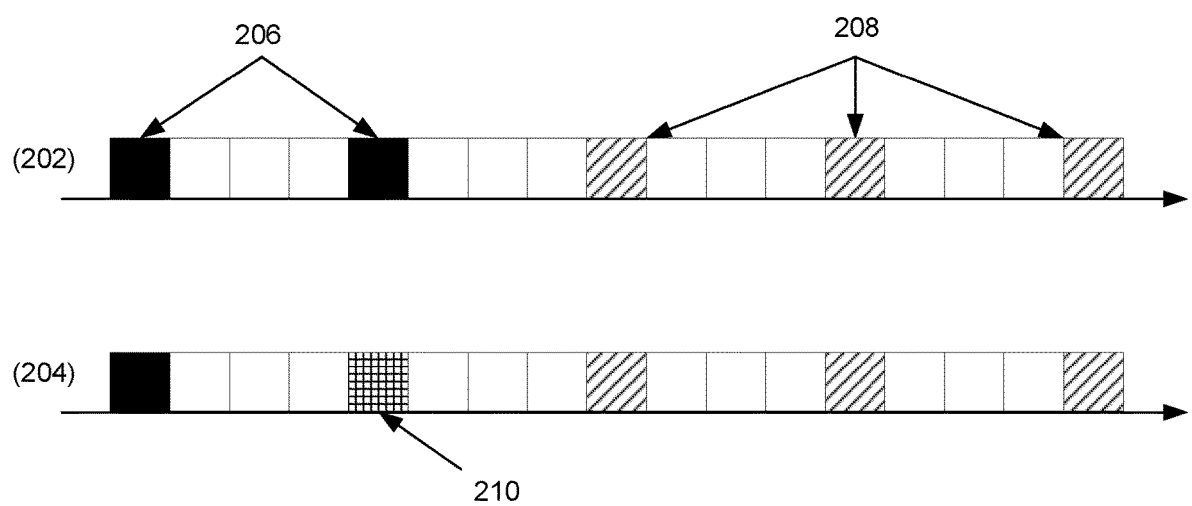
FIGS. 2 and 3 illustrate examples of resource allocations.
Figure 3:
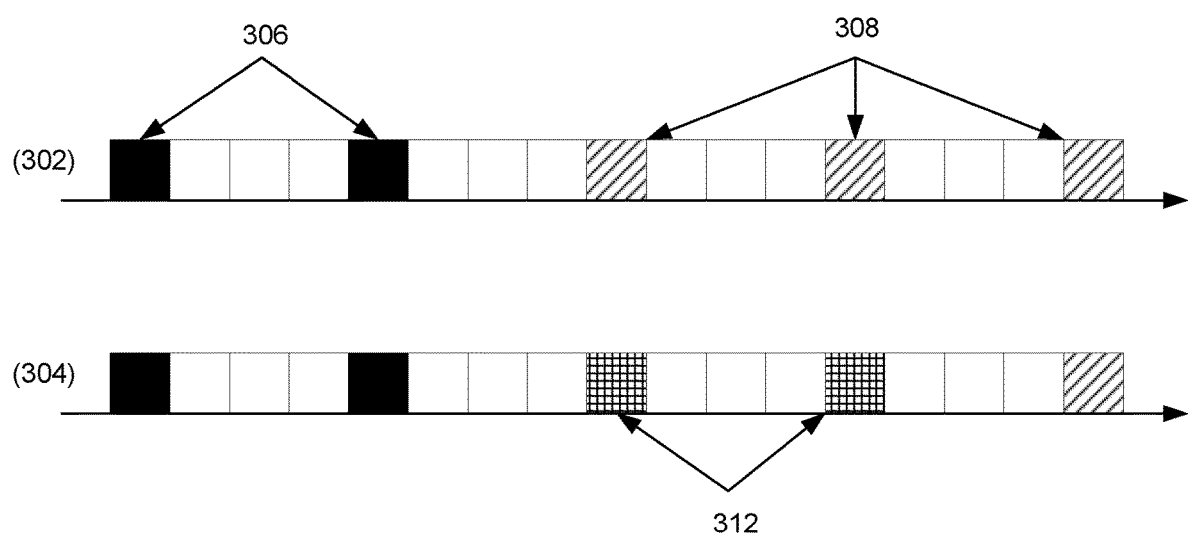

Low-latency high bandwidth applications typically require timely aggregated radio resource allocation both in time and frequency domain. While SPS/configured grant can serve as a baseline for periodic traffic, problems exist with existing implementations. Using UL as an example, since XR file size is typically large, to avoid an over dimension configured grant resource, the configured grant resource will normally be configured to cater to the buffer status report and initial uplink data to lower latency of uplink transmission. For the sake of explanation, a 3:1 TDD example (DDDU) can be used, where two UL slots 206, 306 across 2 TDD periods are allocated with configured grant, as illustrated in FIGS. 2 and 3. These slots can be configured by using multiple configured grants with one slot each, or a single configured grant with multiple slots. The examples of FIGS. 2 and 3 use a configured grant of two, non-consecutive slots. Due to application PDU size variation (or buffer size), existing configured grant implementations have two different problems. A first problem is illustrated in FIG. 2, which shows a configuration 202 with an uplink configured grant 206 and non-configured grant 208, where the other slots are downlink slots in TDD. In this example, the second slot 210 in the first burst of configured grant resources of the actual transmission 204 will not be used when a single slot is sufficient to carry the buffer size and initial data. In the example of FIG. 2, due to, for instance, periodic but variable file size in XR services, some part of the granted resource may be wasted. It would be better to reuse the second slot 210 for other users. In this case, a network should ensure that the unused slot is not actually used by the granted user in order to avoid any potential collision. A second problem is illustrated in FIG. 3, which shows the opposite case with configuration 302 having a UL configured 306 and non-configured grant 308. In this instance, the first burst of configured grant with two slots is insufficient (e.g., due to periodic but variable file size in XR services) in transmission 304, so an extra two slots 312 should be promptly allocated (e.g., fast allocation of extra resource(s)) in order to deliver the corresponding application PDU without significant delay. According to embodiments, the additional slots can be allocated with minimal signaling overhead.

Figure 4:
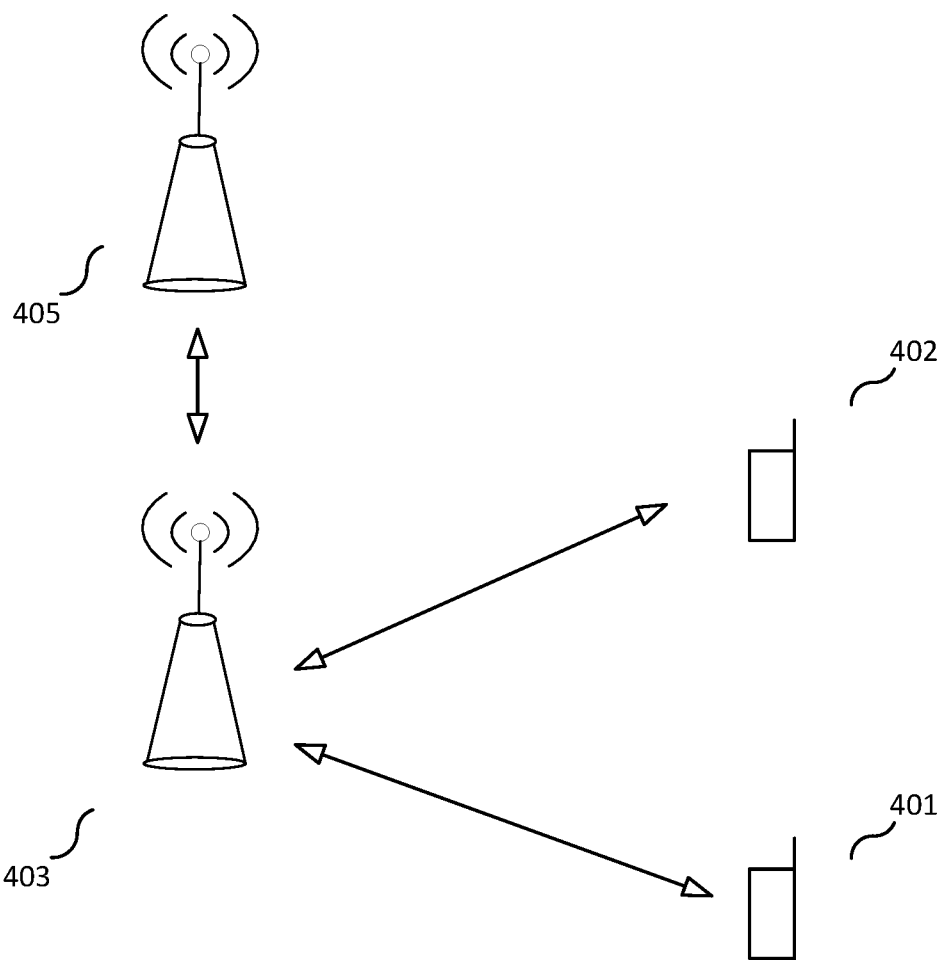
FIG. 4 illustrates a system according to embodiments.

Referring now to FIG. 4, a communication system 400 is shown according to some embodiments. The system may, for instance, implement 5G new radio (NR) and include a first node 403, a second node 405, a first UE 401, and a second UE 402. The nodes may be, for instance, base stations, such as NBs, eNBs, gNBs or other types of wireless access points or network nodes. The UEs may be any form of UE according to embodiments, such as mobile telephones, personal digital assistants, electronic readers, portable electronic tablets, wireless sensors, machine communication devices, personal computers, and laptop computers.

Figure 5:
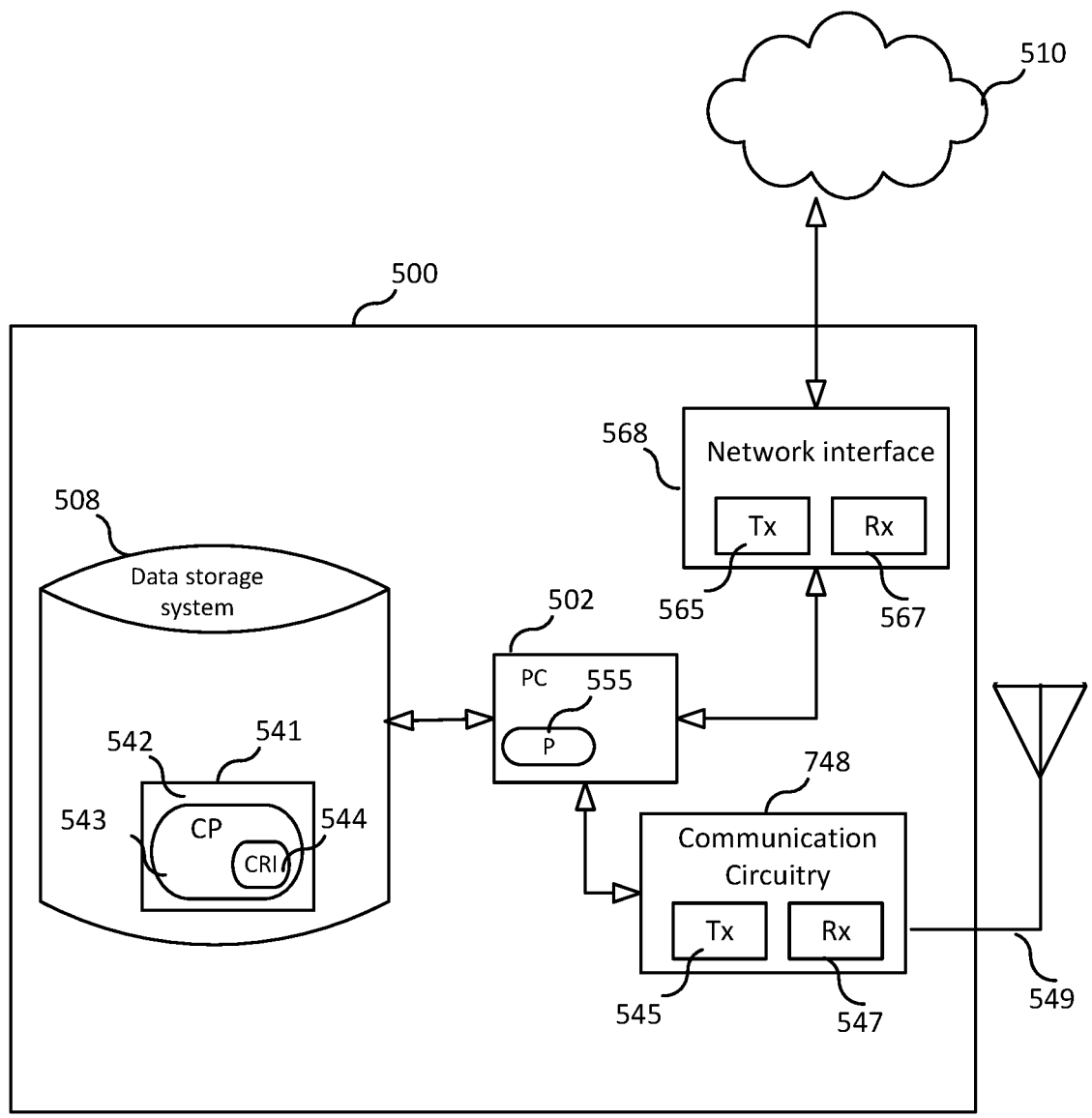
FIG. 5 is a schematic block diagram of a network node according to some embodiments.

Referring now to FIG. 5, a block diagram of an apparatus 500 (e.g., a network node such as nodes 403, 405) is shown according to some embodiments. As shown in FIG. 5, apparatus 500 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 500 may be a distributed computing apparatus); a network interface 568 comprising a transmitter (Tx) 565 and a receiver (Rx) 567 for enabling apparatus 500 to transmit data to and receive data from other nodes connected to a network 510 (e.g., an Internet Protocol (IP) network) to which network interface 568 is connected; communication circuitry 548, which is coupled to an antenna arrangement 549 comprising one or more antennas and which comprises a transmitter (Tx) 545 and a receiver (Rx) 547 for enabling apparatus 500 to transmit data and receive data (e.g., wirelessly transmit/receive data); and a local storage unit (a.k.a., "data storage system") 508, which may include one or more non-volatile storage devices and/or one or more volatile storage devices. In embodiments where PC 702 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes apparatus 500 to perform steps described herein (e.g., steps described herein with reference to the flow charts). In other embodiments, apparatus 500 may be configured to perform steps described herein without the need for code. That is, for example, PC 502 may consist merely of one or more ASICs. Hence, the features of the embodiments described herein may be implemented in hardware and/or software.

Figure 6:
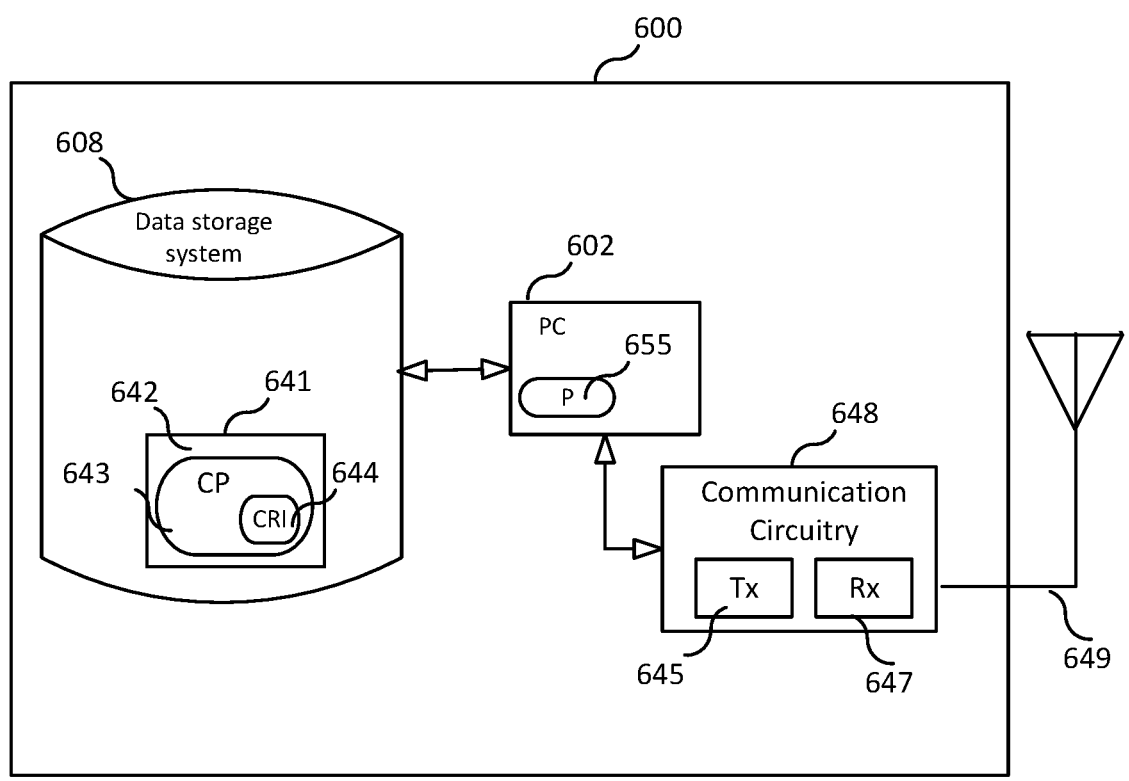
FIG. 6 is a schematic block diagram of a device according to some embodiments.

Referring now to FIG. 6, FIG. 6 is a block diagram of device (e.g., a UE such as UEs 401, 402), according to some embodiments. As shown in FIG. 6, UE 401, 402 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 401, 402 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 401, 402 to perform steps described herein (e.g., steps described herein with reference to the flow charts). In other embodiments, UE 401, 402 may be configured to perform steps described herein without the need for code.

That is, for example, PC 602 may consist merely of one or more ASICs. Hence, the features of the embodiments described herein may be implemented in hardware and/or software.

According to embodiments, methods are provided that enable configured grant/SPS enhancements for fast radio resource allocation adaptation for short-term buffer size variation of periodic XR traffic. Such embodiments may be implemented on one or more of apparatuses 500 and 600.

According to embodiments, a UE, such as UE 401, 402, has a standardized procedure to follow when the actual buffer size is smaller than the granted resource instantaneously. This could correspond, for instance, to the scenario illustrated in FIG. 2. This procedure may be implemented when a configured grant is provided to the UE to allow fast uplink Buffer Status Report (BSR), as well as transmission of a default size of Physical Uplink Share Channel (PUSCH) data, in order to avoid dynamic grant delays for every XR data arrival. In some instances, the PUSCH data can require more than one slot and be non-consecutive. When the actual data size is much smaller than the granted resource amount at a configured grant occasion, according to embodiments, the UE (e.g., UE 401) will inform the network (e.g., node 403) that the rest of the resources will not be used, which allows the network to reuse the unused resources for other users (e.g., UE 402) that may need the resources.

According to a first procedure, when the buffer of all logical channel groups becomes empty during the length (or indicated slots/resource) of a configured grant, a UE starts a timer. Until the timer is expired, the UE is still allowed to transmit data, including new data during the length of the configured grant, in the granted resource. This could be, for instance, new data that comes into the buffer for transmission before the time expires.

Alternatively, and according to a second procedure, as soon as the buffer becomes empty during each granted resource, a UE starts the procedure immediately. That is, the UE will not transmit on any of the remaining uplink slots. This can be implemented, for example, by a timer with a zero-value duration, or a non-configured timer. In other words, a zero value could be a default setting when no configuration is received from the node.

On the network side (e.g., at node 403), a node can receive an indication that the last data indicated by a previous buffer status report has been sent. This could be, for instance, one or more padding bits or other direct indication, such as a designated bit. With respect to the padding, the gNB can consider it as an implicit indication that the UE will initiate a timer for ceasing use of the resources (e.g., the first procedure above), or start the process immediately (e.g., the second procedure above). In certain aspects, and with respect to the padding, the UE could send a padding MAC subPDU, which may comprise headers and padding bits. Whether the first or second procedure is used by the UE, as well as the duration of the time where applicable, can be configured by the node. For instance, it may be configured by RRC and/or with the configured grant. A UE's autonomous stopping of accessing granted resources can avoid signalling with the network, thereby reducing overhead, and can also ensure potential collision avoidance when the remaining resource is allocated to other users. In certain aspects, when an indication is received that the entirety of the configured grant may not be needed, a node can estimate possibly reusable resources in that configured grant occasion. However, if the node does not receive the padding (or other indication), it will not initiate any reuse procedure of the remaining granted resource.

According to embodiments, signaling of the timer value could comprise situations where: (i) the RRC signaling from the network node includes a time duration value, such as "0" or another value; or (ii) the RRC signaling does not include an Information Element (IE) (e.g., where the IE is optional), such that it implicitly does not configure the timer. In certain embodiments, a non-configuration results in a value of zero for the timer.

Figure 7A:
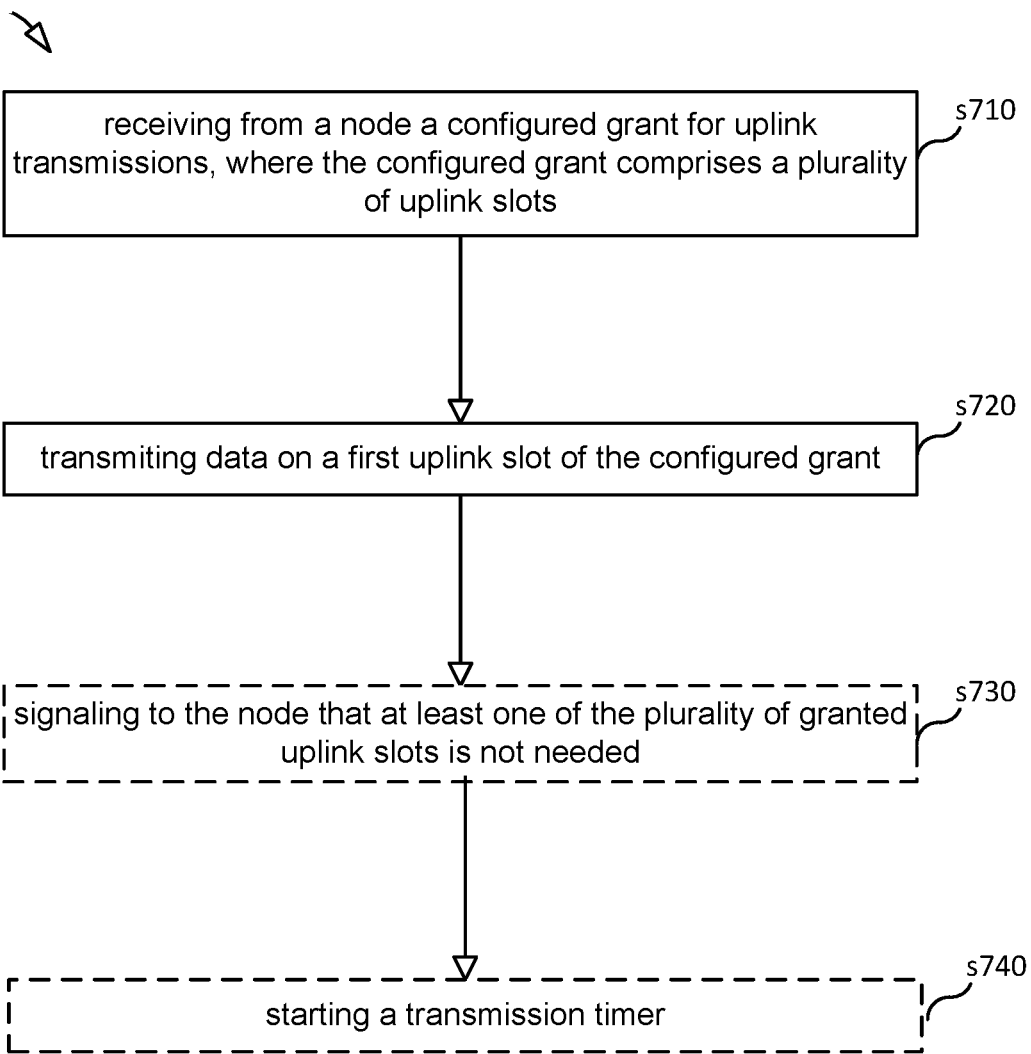
FIGS. 7A and 7B are flow charts illustrating a process according to embodiments.

FIG. 7A is a flowchart illustrating a process 700 according to some embodiments. The process may be performed, for instance by a UE 701, 702 in communication with a node 403. For example, process 700 may be performed in the situation described with respect to FIG. 2.

The process may begin with step s710, in which a node (e.g., gNB) receives a configured grant for uplink transmissions. According to embodiments, the configured grant comprises a plurality of uplink slots or allocations (e.g., on PUSCH).

In step s720, which may be optional in some embodiments, the UE transmits data on a first uplink slot (or allocation) of the configured grant. This may be, for instance, before starting a transmission timer.

In step s730, the UE signals to the node that at least one of the plurality of granted uplink slots (or allocations) is not needed by the UE. The signaling may comprise, for example, sending padding, such as one or more padding bits. In step s740, the UE starts a transmission timer. In some embodiments, the value of the time may be zero. The configuration of the timer (e.g., its value) may be received, for instance, via RRC from the node before one or more steps of 700. The order of steps s730 and s740 may be reversed in some embodiments, or performed simultaneously. According to embodiments, one or more of step s730 and s740 are performed when no data remains for uplink transmission during the configured grant occasion. This may be, for example, when the buffers for all logical channels that are allowed to use or transmit on the configured grant are empty. For instance, the process 700 may include determining that a buffer size for the UE is smaller than the transmission size available from the uplink slots remaining in the length (or indicated slots/resource) of the configured grant (e.g., the buffer is empty), and then one or more of starting the timer and the signaling is based at least in part on the determining. In some embodiments, new data is transmitted on a second uplink slot (or allocation) of the configured grant before expiration of the timer (e.g., new to the buffer); however, no new data is transmitted after expiration of the time. In certain aspects of process 700, the UE may perform one or more of the first and second procedures described above.

Figure 7B:
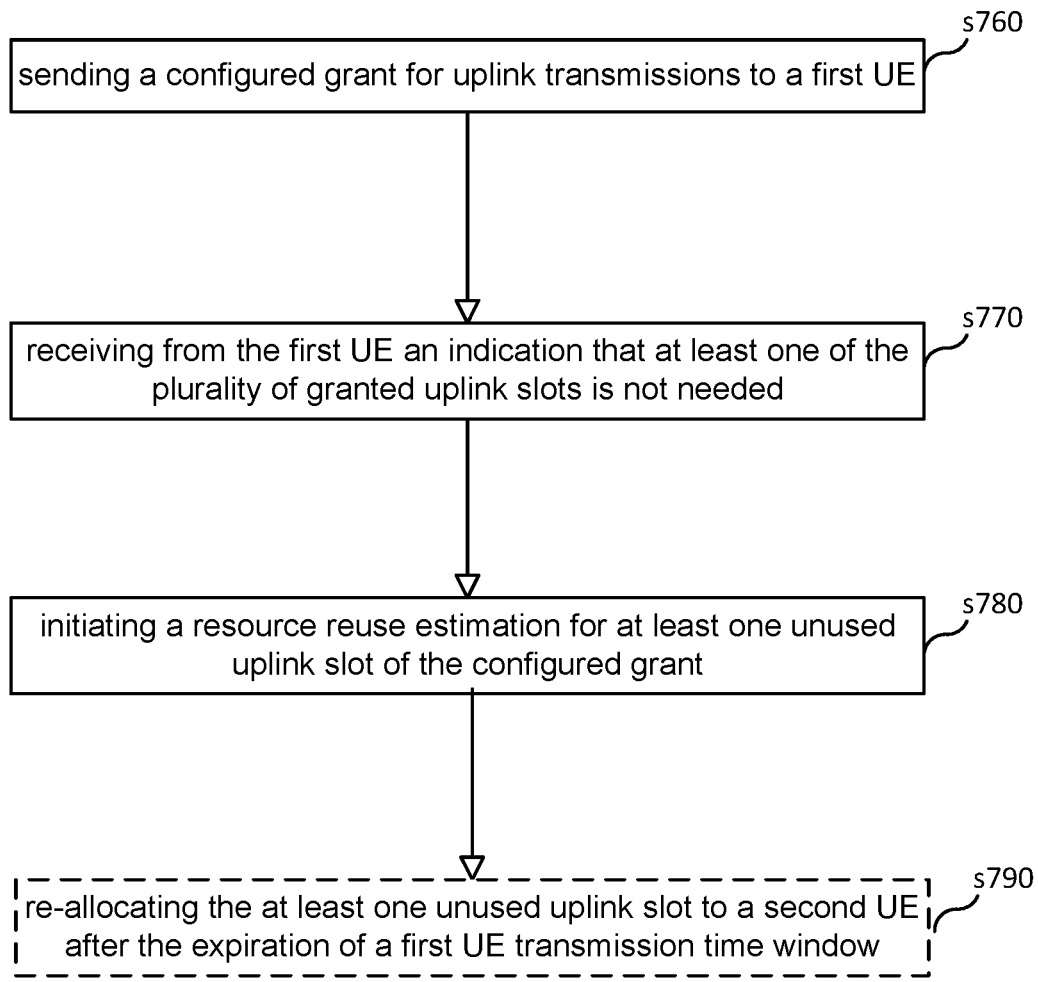

FIG. 7B is a flowchart illustrating a process 750 according to some embodiments. The process may be performed, for instance by a node 403 in communication with one or more UEs 401, 402. For example, process 750 may be performed in the situation described with respect to FIG. 2.

The process may begin with step s760, which comprises sending a configured grant for uplink transmissions to a first UE 401, wherein the configured grant comprises a plurality of uplink slots (or allocations), such as PUSCH. In step s770, the node receives, from the first UE, an indication that at least one of the plurality of granted uplink slots is not needed. This may include, for example, the receipt of padding. In step s780, then node initiates a resource reuse estimation for at least one unused uplink slot of the configured grant. In step s790, which may be optional, the node re-allocates the at least one unused uplink slot to a second UE 402 after the expiration of a first UE transmission time window, which may correspond to a transmission timer at the first UE. However, and according to embodiments, data may still be received from the first UE on an uplink slot of the configured grant even after receiving the indication, when the data is transmitted from the first UE before expiration of the UE transmission time window.

According to embodiments, a node 403 (e.g., a gNB) can send a UE (e.g., 401, 402) a single dynamic grant for one, or more than one, PUSCH allocation when the default configured grant is insufficient. This may be, for instance, due to instantaneously large file arrival. An example of this situation is illustrated with respect to FIG. 3. In certain aspects, in order to support flexible allocation, a multi-PUSCH DCI in a single dynamic grant will support non-consecutive slot allocation. For example, an information bit can be added in DCI in order to indicate the slot index to be granted. Alternatively, the time domain resource allocation list that the DCI refers to can be expanded to include the slot index in the list entry.

According to embodiments, a single DCI can be used for multi-PUSCH dynamic grants using a legacy DCI with an extended resource allocation table (e.g., signaled by RRC). For example, the $K_2$ parameter denoting the slot offset between the scheduling DCI and scheduled PUSCH can be indicated separately for each scheduled PUSCH transmission. This can be achieved by, for example, by configuring the uplink time domain resource allocation table with a list of values of $K_2$, with each value in the list corresponding to a scheduled PUSCH. Alternatively, a new DCI format can be used. For example, a time allocation bit map in a new DCI can be used to indicate which slots or mini-slots are allocated for the multiple PUSCH transmissions. For example, a bit map of "0011" could indicate two PUSCH transmissions are scheduled in the last two slots out of four slots.

Figure 8A:
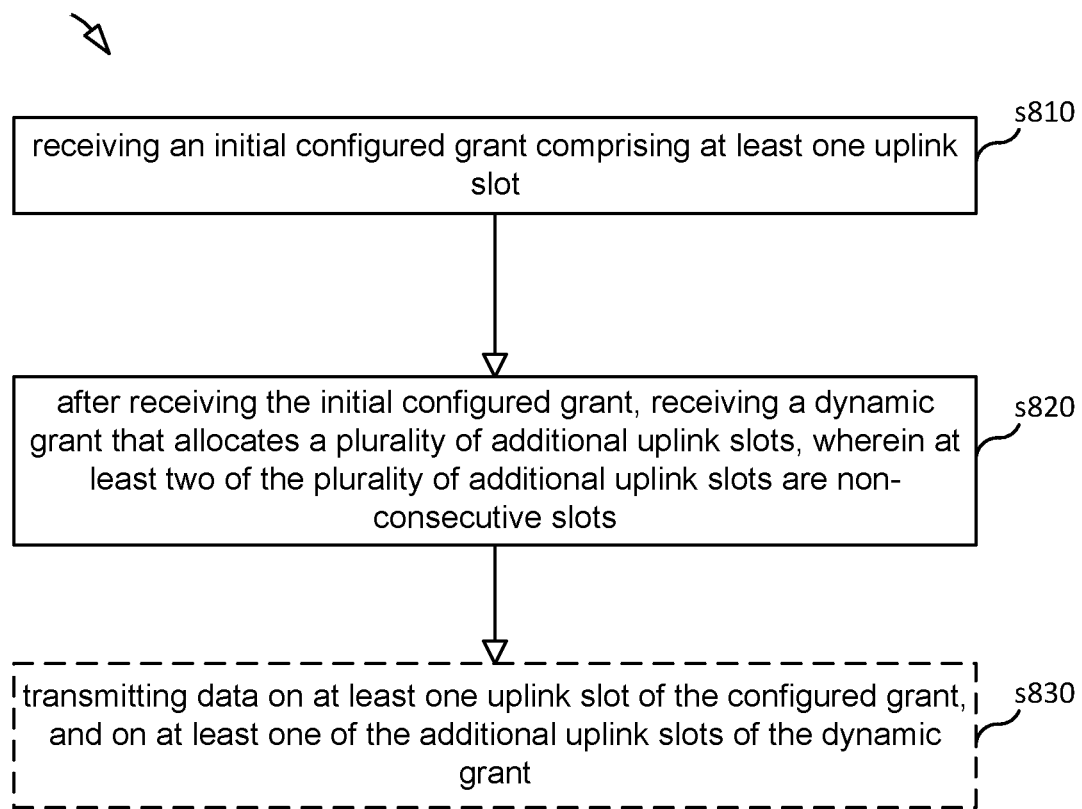
FIGS. 8A and 8B are flow charts illustrating a process according to embodiments.

FIG. 8A is a flowchart illustrating a process 800 according to some embodiments. The process may be performed, for instance by a UE 401, 402 in communication with a node 403, such as a gNB. For example, process 800 may be performed in the situation described with respect to FIG. 3.

The process may begin with step s810, in which the UE receives an initial configured grant comprising at least one uplink slot. In step s820, and after receiving the initial configured grant, the UE receives a dynamic grant that allocates a plurality of additional uplink slots. According to some embodiments, at least two of the plurality of additional uplink slots are non-consecutive slots. In certain aspects, the initial configured grant may be insufficient for uplink transmission (e.g., due to variable file size). In step s830, which may be optional, the UE transmits data on at least one uplink slot of the configured grant, and on at least one of the additional uplink slots of the dynamic grant. In certain aspects, the total size of the data transmitted on the uplink slots of the configured grant and the additional slots of the dynamic grant is greater than a size indicated by a buffer status report corresponding to the initial configured grant. In some embodiments, the additional uplink slots are indicated by a DCI information bit received on PDCCH. In some embodiments, the process may also include receiving, from the node a time domain resource allocation list via RRC, where the additional, non-consecutive uplink slots are indicated by a DCI bit pointing to one or more entry index of the list. The receipt of the list may be the first step of process 800 in some embodiments. The process may also include the UE reporting its buffer status to the node.

Figure 8B:
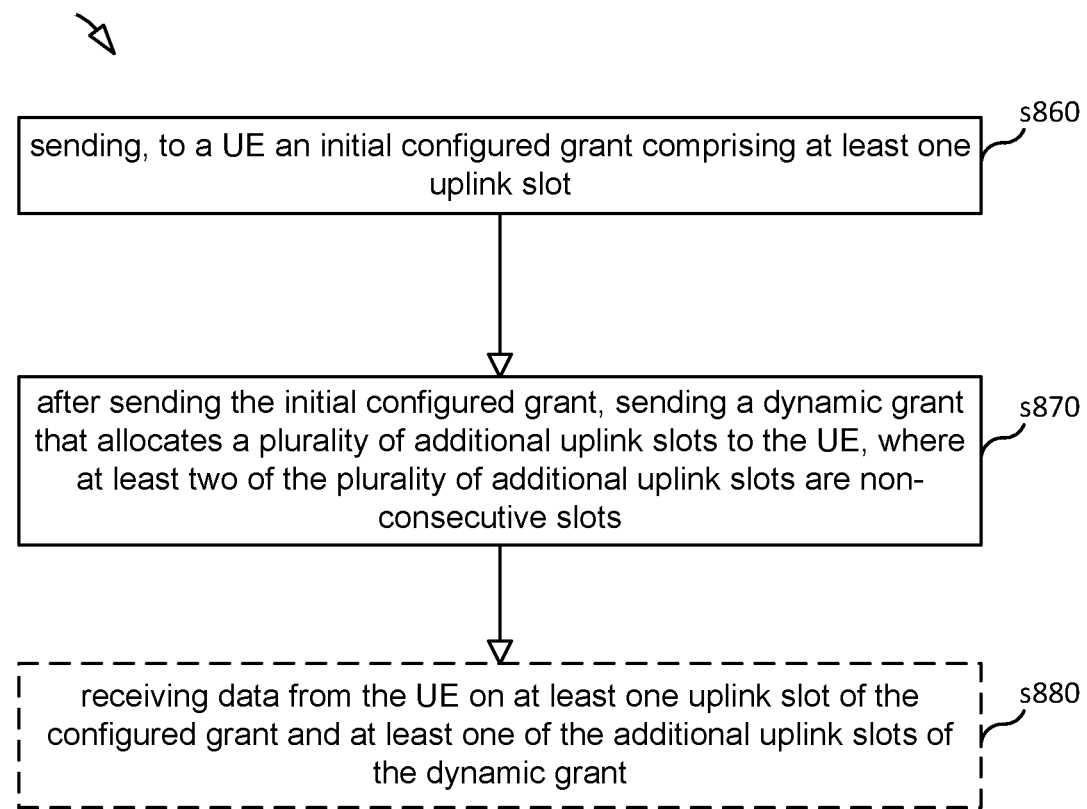

FIG. 8B is a flowchart illustrating a process 850 according to some embodiments. The process may be performed, for instance by a node 403 in communication with one or more UEs 401, 402. For example, process 850 may be performed in the situation described with respect to FIG. 3.

The process may begin with step s860, which comprises sending, to a UE (e.g., 401), an initial configured grant comprising at least one uplink slot. In step s870, after sending the initial configured grant, the node sends a dynamic grant that allocates a plurality of additional uplink slots to the UE. In some embodiments, the dynamic grant may be sent in response to an indication from the UE that the initial configured grant is insufficient, such as a buffer status report (BSR) or a dedicated bit or other designated information, for example in a transmission on at least one uplink slot of the configured grant. In certain aspects, at least two of the plurality of additional uplink slots are non-consecutive slots. This may be a single dynamic grant that provides fast slot allocation for non-consecutive slots. According to embodiments, the initial configured grant was insufficient for uplink transmission from the UE (e.g., due to variable file size). In step s880, which may be optional, the node receives data from the UE on at least one uplink slot of the configured grant and at least one of the additional uplink slots of the dynamic grant. The total size of the data transmitted on the uplink slots of the configured grant and the additional slots of the dynamic grant can be greater than a size indicated by a buffer status report from the UE corresponding to the initial configured grant.

According to embodiments, dynamic activation and deactivation of multiple configured grants can be used to adapt the amount of granted resources for a UE, such as UEs 401, 402. In certain aspects, each configured grant may have a different start and possibly different duration, or different resource allocation. In a legacy system, each of the extra configured grants is activated separately when the currently activated configured grant does not give a sufficient amount of resources. In addition, reactivation signaling is needed if deactivation during only a short duration of time is intended, for instance, to accommodate a sudden decrease of buffer size. Compared to existing dynamic allocation of extra resources, techniques described herein can avoid frequent DCI signaling when the default size of the granted resources is semi-statically varying, for example, with application layer rate adaptation leading to average file size change. According to embodiments, several solutions are proposed to minimize control signaling for dynamic activation, deactivation, and/or reactivation of one, or a set of, configured grants.

In one solution, the activation procedure of an extra configured grant includes a time window. In this embodiment, the activation will be valid only during the specified time window. This may be from the instant that the activation signal is received, for example. When the time window is expired, a UE (e.g., UE 401) automatically deactivates the use of the extra configured grant. This will avoid the need for another deactivation signal from the node (e.g., node 403) in the next burst of traffic. According to embodiments, the activation may be for multiple configured grants, for instance, as described in connection with FIGS. 10A-10D.

In another solution, the deactivation procedure for one or more of the default configured grants includes a time window for when the UE buffer size is instantaneously smaller than the default amount of resources. The network can send a single DCI for one or multiple configured grant deactivations to the UE. This deactivation is valid only during the time window, such that the need for reactivation signaling of the default configured grants in the next burst of traffic arrival is avoided.

To support one or more embodiments discussed herein, two configuration classes can be introduced. In a first class, a configured grant is valid as long as it is not deactivated. This can be achieved, for example, by not configuring the aforementioned time window, or configuring an infinity value for the time window. In a second class, a configured grant is valid only for a duration of the specified time window after the configured grant is activated. In some instances, the first class can be mapped to legacy configured grants. Configuration of the time window (e.g., duration), and the marking of classes of configured grant, can be signaled by RRC. This signaling can be implicit to allow legacy configured grants by not configuring the time window, or can be explicit by signaling the class of configured grant or time window size.

In some embodiments, a single DCI can also support activating more than one configured grant in order to reduce overhead of DCI. For instance, the same resource allocation signaled in the DCI can be applied to all the configured grants that are activated in one shot by the DCI. Indication of which set of configured grants is activated can be included in the DCI, for instance, through the reuse of a HARQ bit.

According to embodiments, similar techniques can be applied for SPS, including for multi-PDSCH SPS activation. For example, activation and/or deactivation for the downlink can similarly be limited by a validity window. In some embodiments, the processes of FIGS. 9A and 9B can be used for downlink, where downlink DCI is used instead up uplink DCI. In certain aspects, the disclosed multiple activation, window, dual classes of grant, RRC configurations, etc. are applicable to DL SPS.

Figure 9A:
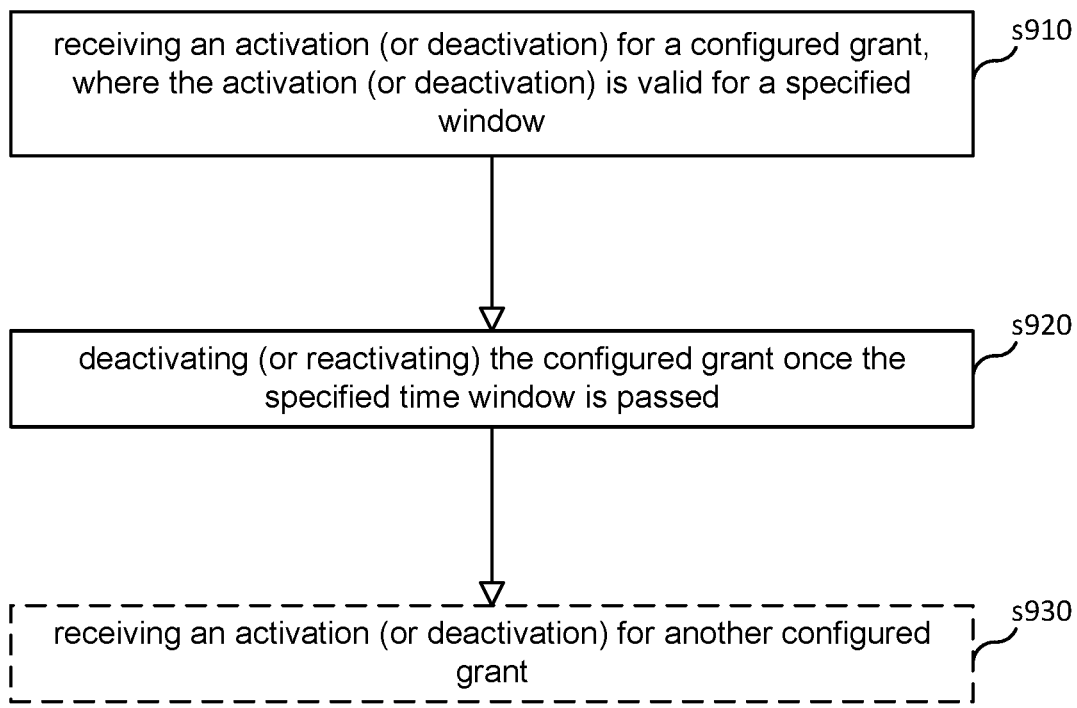
FIGS. 9A and 9B are flow charts illustrating a process according to embodiments.

FIG. 9A is a flowchart illustrating a process 900 according to some embodiments. The process may be performed, for instance by a UE 401,402 in communication with a node 403 (e.g., gNB). According to embodiments, the process 900 can be used for both activation and deactivation depending on the desired effect.

The process may begin with step s910, in which a UE receives an activation for a configured grant (e.g., an allocation of periodic uplink slots). While an activation is initially used as an example, it may instead be a deactivation according to embodiments. In some embodiments, the activation (or deactivation) is valid for a specified time window. The activated or deactivated configured grant may be one of multiple configured grants for the UE. In some embodiments, multiple configured grants are activated or deactivated by a single DCI.

In step s920, the UE deactivates (or reactivates) the configured grant once the specified time window is passed (e.g., expired). For instance, where the indication of step s910 is an activation, the UE does not perform any transmission during the remainder of the original configured grant. Where the indication of step s910 was a deactivation, the UE can resume transmissions after the window passes. According to embodiments, one or more of the configured grant and duration of the time window are defined by a configuration received from a node.

In step s930, which may be optional in some embodiments, the UE receives an activation for a second configured grant, wherein the second configured grant remains valid until a deactivation signal is received from a node (e.g., it does not have a corresponding time window, or is configured with infinite size time window). The converse may also be implemented, where the received indication is a deactivation that remains valid until reactivated by the node.

Figure 9B:
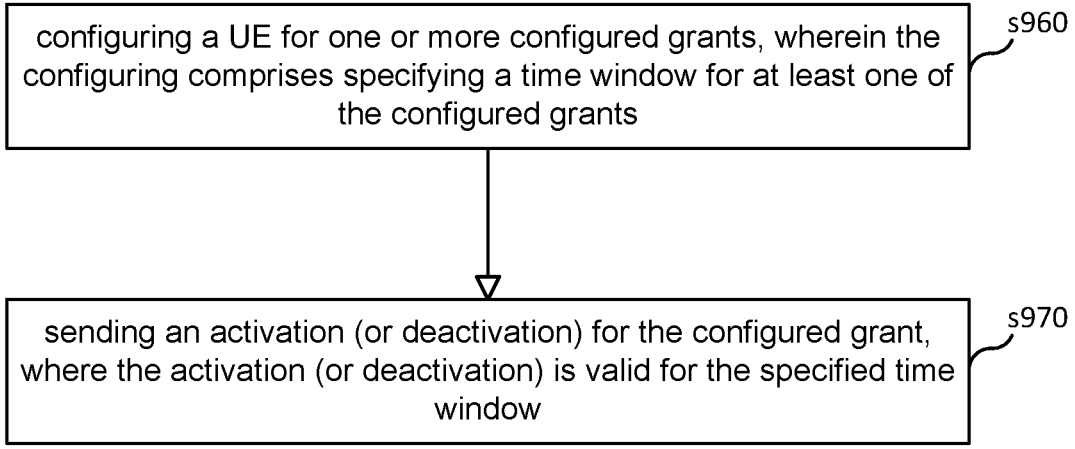

FIG. 9B is a flowchart illustrating a process 950 according to some embodiments. The process may be performed, for instance by a node 403 in communication with one or more UEs 401, 402. Again, the process can be used for both activation and deactivation depending on the desired effect.

The process 950 may begin with step s960, which comprises configuring a UE for one or more configured grants, wherein the configuring comprises specifying a time window for at least one of the configured grants. In step s970, the node sends an activation (or deactivation) for the configured grant (e.g., an allocation of periodic uplink slots), where the activation (or deactivation) is valid for the specified time window. In certain aspects, the activation or deactivation of a grant may be sent in response to an indication from the UE.

In certain aspects, one or more of the foregoing can be applied except using downlink DCI for PDSCH transmission. For instance, the processes described in FIGS. 9A and 9B can be applied in the downlink.

According to embodiments, methods and devices are provided for activating a single configured grant for multi-PUSCH allocation. As an example, and in some embodiments, the higher layer parameter cg-nrofSlots-r16 provides the number of consecutive slots allocated within a configured grant period; the higher layer parameter cg-nrof-PUSCH-InSlot-r16 provides the number of consecutive PUSCH allocations within a slot. Other parameters, or equivalent parameters, may be used according to some embodiments.

Referring now to FIGS. 10A-10D, illustrations of time domain resource allocations lists and configured grants are provided according to some embodiments.

Figures 10A, 10B:
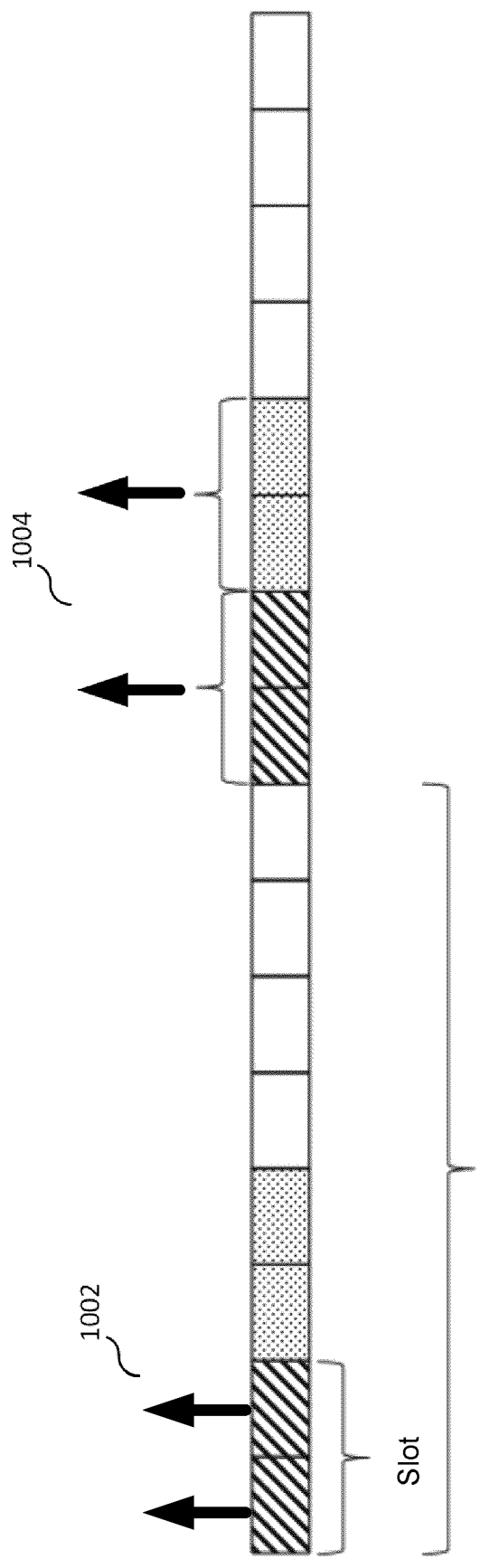
FIGS. 10A-10D illustrate time domain resource allocations lists and configured grants according to some embodiments.

In FIG. 10A, a time domain resource allocation list is provided. In this example: "$K_2$" is used to indicate the slot for PUSCH transmission; "S" is used to indicate the start OFDM symbol index in the scheduled slot for the PUSCH transmission; "L" is used to indicate the length of OFDM symbols in the scheduled slot for the PUSCH transmission; and ($K_2[n][m]$, $S[n][m]$, $L[n][m]$) are the PUSCH time allocation for the (m+1)-th PUSCH in the (n+1)-th entry of the list. In this example, there are a total of MnPUSCH allocations in the (n+1)-th entry. Ma can be different for different entries in the list. According to embodiments, DCI points to the entry index of the list. The UE (e.g., 401) can then derive how many PUSCHs are scheduled, and the allocation for each PUSCH. FIG. 10B illustrates a configured grant, and shows a plurality of slots and a periodicity (four slots in this example). There may be, for instance, a number of consecutive PUSCH allocations within a slot 1002 (2 in this case), which may be provided by a parameter, such as cg-nrofPUSCH-InSlot-r16. There may also be a number of consecutive slots allocated within a configured grant period 1004 (2 in this case), which may be provided by a parameter, such as cg-nrofSlots-r16.

Figure 10C:
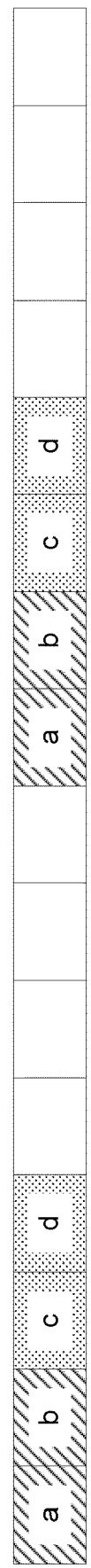

In certain aspects, the network configures a time domain resource allocation list that includes a first subset of entries that can be used to schedule single-PUSCH, and a second subset of entries that can be used to schedule multi-PUSCH. The DCI activating a multi-PUSCH configured grant can point to an entry in the first subset of entries. The first configured grant PUSCH allocation in the multi-PUSCH configured grant follows the entry in the first subset signaled in the DCI, and the remaining PUSCH allocations have the same length and PUSCH mapping type, and are appended following the previous allocations without any gaps. The same combination of start symbol and length and PUSCH mapping type repeats over the consecutively allocated slots. This can be illustrated with reference to FIG. 10C, where a configured grant activation DCI points to an entry among the entries with single PUSCH. The value of the entry determines the time allocation of the first uplink allocation (e.g., PUSCH) in a period ("a" in FIG. 10C). The remaining PUSCH allocations of the configured grant period have the same length and are appended following the previous allocations ("b" in FIG. 10C). According to embodiments, the same combination of start symbol and length repeats over the consecutively allocated slots: (c, d) repeats after (a, b), as shown in FIG. 10C.

Figure 10D:
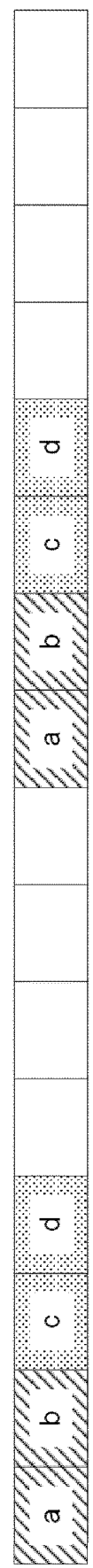

In certain aspects, the DCI activating a multi-PUSCH configured grant refers to an entry in a time domain resource allocation list. If the entry includes multi-PUSCH allocation, one PUSCH allocation out of the multi-PUSCH allocation (e.g., the first PUSCH allocation in the entry indicating multi-PUSCH allocation, highlighted with a box 1006 in FIG. 10D) is selected and used by the first configured grant PUSCH allocation in the multi-PUSCH configured grant. The remaining configured grant PUSCH allocations have the same length and PUSCH mapping type, and are appended following the previous allocations without any gaps. The same combination of start symbol and length and PUSCH mapping type repeats over the consecutively allocated slots. This can be illustrated with reference to FIG. 10D. In this example, the configured grant activation DCI points to an entry in the list, such as index "n", which is a multi-PUSCH entry. The value of the first element in the entry determines the time allocation of the first configured grant PUSCH in a period, such as ($K_2$[n][0], S[n][0], L[n][0]) in the table and "a" in FIG. 10D. The remaining configured grant PUSCH allocations of the period have the same length and are appended following the previous allocations ("b" in FIG. 10D). According to embodiments, the same combination of start symbol and length repeats over the consecutively allocated slots: (c, d) repeats after (a, b), as shown in FIG. 10D.

In certain aspects, the DCI activating a multi-PUSCH configured grant refers to an entry in a time domain resource allocation list. In this example, the entry directly provides information on which slot(s) are allocated within a configured grant period and which symbol(s) are allocated within a slot. In other words, the information carried in the DCI overrides the configuration provided by the higher layer parameters, such as cg-nrofSlots-r16 and cg-nrofPUSCH-InSlot-r16. Alternatively, the higher layer parameters, such as cg-nrofSlots-r16 and cg-nrofPUSCH-InSlot-r16 are not configured, as the multi-PUSCH configured grant resource allocation information is directly carried in the DCI (and table). This can also be illustrated with reference to FIG. 10D, but where cg-nrofPUSCH-InSlot-r16 and cg-nroSlots-r16 are not used or are overridden by DCI. In this example, the configured grant activation DCI points to an entry in the list, such as index "n". The entry directly provides information on which slot(s) are allocated within a configured grant period and which symbol(s) are allocated within a slot: (i) ($K_2$[n][0], S[n][0], L[n][0]) in the table for configured grant PUSCH "a" in FIG. 10D; (ii) ($K_2$[n][1], S[n][1], L[n][1]) in the table for configured grant PUSCH "b" in FIG. 10D; (iii) ($K_2$[n][2], S[n][2], L[n][2]) in the table for configured grant PUSCH "c" in FIG. 10D; and (iv) ($K_2$[n][3], S[n][3], L[n][3]) in the table for configured grant PUSCH "d" in FIG. 10D.

According to embodiments, similar techniques can be applied for a new SPS implementation, including for multi-PDSCH SPS activation. For example, multiple PDSCH grants can be activated using the foregoing and/or the processes of FIGS. 11A and 11B using the downlink DCI (and associated tables) instead of uplink.

Figure 11A:
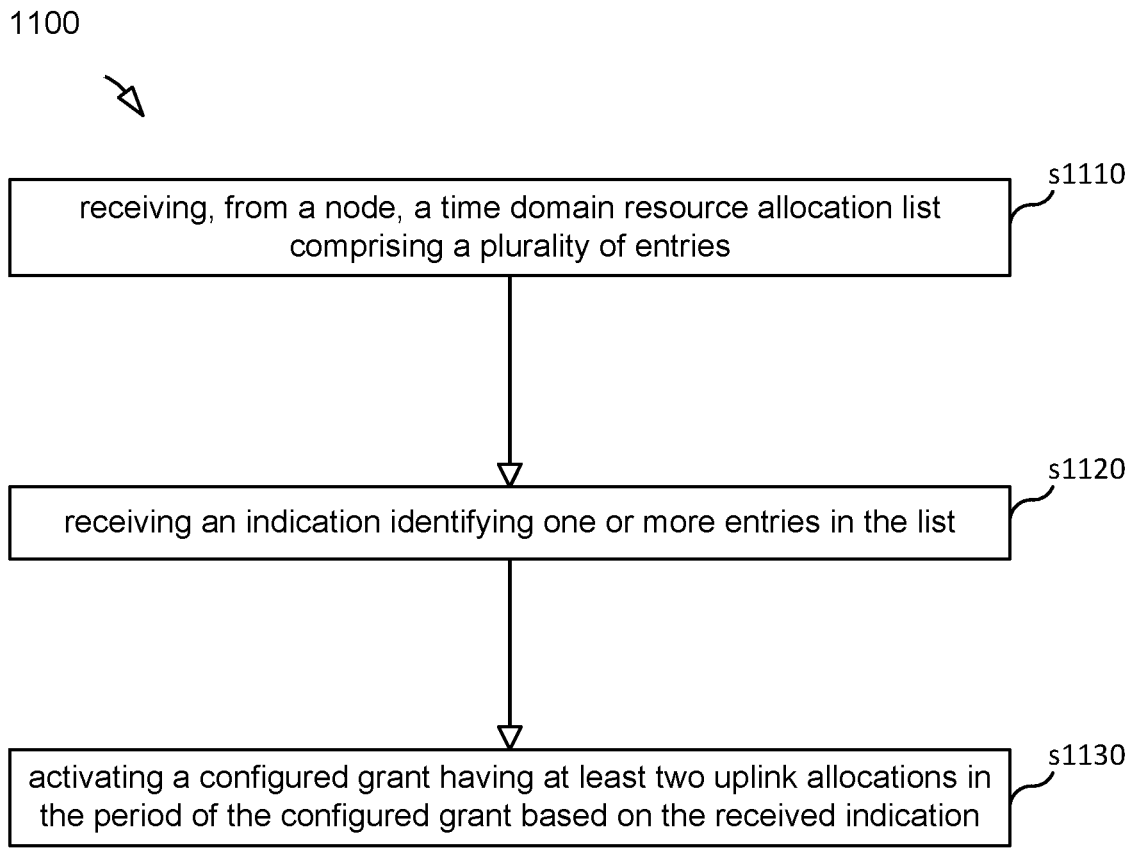
FIGS. 11A and 11B are flow charts illustrating a process according to embodiments.

FIG. 11A is a flowchart illustrating a process 1100 according to some embodiments. The process may be performed, for instance by a UE 401, 402 in communication with a node 403 (e.g., gNB).

The process may begin with step s1110, which comprises receiving, from a node (e.g., gNB), a time domain resource allocation list comprising a plurality of entries. In step s1120, an indication (e.g., DCI) is received identifying one or more entries in the list. In step s1130, a configured grant having at least two uplink allocations in the period of the configured grant is activated based on the received indication.

Figure 11B:
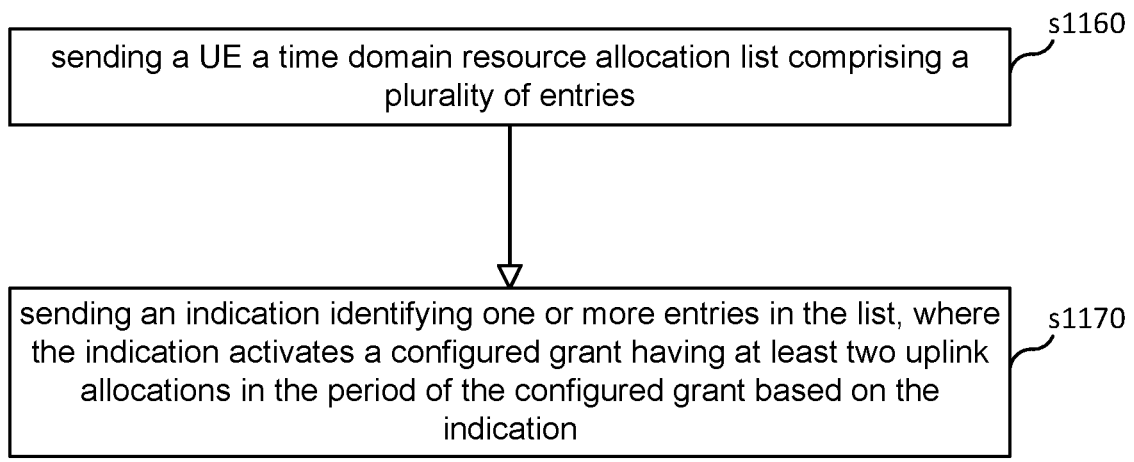

FIG. 11B is a flowchart illustrating a process 1150 according to some embodiments. The process may be performed, for instance by a node 403 in communication with one or more UEs 401, 402.

The process may begin with step s1160, which comprises sending a UE a time domain resource allocation list comprising a plurality of entries. In step s1170, the node sends an indication (e.g., DCI) identifying one or more entries in the list, where the DCI activates a configured grant having at least two uplink allocations in the period of the configured grant based on the indication. In certain aspects, the activation of a grant may be sent in response to an indication from the UE that an initial configured grant is insufficient.

According to aspects of the disclosure, and in some embodiments, the devices, signaling, and processes described above and illustrated with respect to FIGS. 7-11 can be applied to SPS. For instance, similar implementations may be used for multi-PDSCH SPS activation. For example, the processes described in FIGS. 11A and 11B can be used, except with downlink DCI for PDSCH transmission.

FURTHER EXAMPLES

A1. A method performed in a User Equipment (UE) comprising: receiving from a node (e.g., gNB) a configured grant for uplink transmissions, wherein the configured grant comprises a plurality of uplink slots (e.g., on Physical Uplink Shared Channel (PUSCH)); signaling to the node that at least one of the plurality of granted uplink slots is not needed by the UE; and starting a transmission timer.

A2. The method of A1, further comprising: transmitting data on a first uplink slot of the configured grant before starting the timer.

A3. The method of A1 or A2, wherein the transmission timer is started when no data remains for uplink transmission during the configured grant occasion (e.g., when the buffers for all logical channels that are allowed to use or transmit on the configured grant are empty).

A4. The method of any of A1-A3, further comprising: determining that a buffer size for the UE is smaller than the transmission size available from the uplink slots remaining in the length (or indicated slots/resource) of the configured grant (e.g., the buffer is empty), wherein one or more of starting the timer and the signaling is based at least in part on the determining.

A5. The method of any of A1-A4, wherein signaling to the node comprises sending padding to the node in an uplink transmission using one of the uplink slots.

A6. The method of any of A2-A5, further comprising: transmitting new data on a second uplink slot of the configured grant before expiration of the timer.

A7. The method of A6, further comprising: restarting the transmission timer or starting a new transmission timer.

A8. The method of any of A2-A7, wherein no additional data is transmitted during the configured grant after expiration of the timer.

A9. The method of any of A1-A8, wherein the transmission timer is configured to have a value of zero (e.g., a configuration of a zero value could be a default setting when no configuration is received form the node, or specifically set or received).

A10. The method of any of A1-A9, further comprising: receiving from the node via Radio Resource Control (RRC) a configuration of the timer, wherein the configuration comprises the timer value.

A11. The method of any of A1-A10, wherein signaling to the node comprises sending a dedicated indication bit (or set of bits).

B1. A method performed in a node (e.g., gNB) comprising: sending a configured grant for uplink transmissions to a first UE, wherein the configured grant comprises a plurality of uplink slots (e.g., on Physical Uplink Shared Channel (PUSCH)); receiving from the first UE an indication that at least one of the plurality of granted uplink slots is not needed; and initiating a resource reuse estimation for at least one unused uplink slot of the configured grant.

B2. The method of B1, further comprising: re-allocating the at least one unused uplink slot to a second UE after the expiration of a first UE transmission time window (e.g., corresponding to a transmission timer at the first UE).

B3. The method of A1 or A2, further comprising: receiving data from the first UE on a first uplink slot of the configured grant after receiving the indication, wherein the data is transmitted from the first UE before expiration of the UE transmission time window.

B4. The method of A1-A3, wherein the received indication indicates that no data remains for uplink transmission from first UE during the configured grant occasion.

B5. The method of any of B1-B4, wherein initiating a resource reuse estimation comprises starting a timer at the node, and wherein the unused uplink slot is re-allocated to a second UE after expiration of the timer.

B6. The method of any of B1-A5, wherein the received indication comprises padding in an uplink transmission received on one of the uplink slots.

B7. The method of any of B2-B6, wherein the transmission time window has a zero value (e.g., a configuration of a zero value could be a default setting when no configuration is received form the node, or specifically set or received).

B8. The method of any of B2-B7, wherein sending the configured grant comprises transmitting via Radio Resource Control (RRC) a configuration for a UE transmission timer, wherein the configuration comprises the timer value.

B9. The method of any of B1-B8, wherein there received indication comprises dedicated indication bit (or set of bits).

C1. A method performed in a UE, comprising: receiving an initial configured grant comprising at least one uplink slot; and after receiving the initial configured grant, receiving a dynamic grant that allocates a plurality of additional uplink slots, wherein at least two of the plurality of additional uplink slots are non-consecutive slots.

C2. The method of C1, wherein the initial configured grant is insufficient for uplink transmission (e.g., due to variable file size).

C3. The method of C1 or C2, further comprising: transmitting data on at least one uplink slot of the configured grant and at least one of the additional uplink slots of the dynamic grant.

C4. The method of C3, wherein the total size of the data transmitted on the uplink slots of the configured grant and the additional slots of the dynamic grant is greater than a size indicated by a buffer status report corresponding to the initial configured grant.

C5. The method of any of C1-C4, wherein receiving the dynamic grant comprises receiving a single dynamic grant that provides fast slot allocation for non-consecutive slots.

C6. The method of any of C1-C5, wherein the additional uplink slots are indicated by a DCI information bit received on Physical Downlink Control Channel (PDCCH).

C7. The method of C6, wherein the DCI indicates an entry in an extend resource allocation table.

C8. The method of C6, wherein the format of the DCI comprises a time allocation bit map.

C9. The method of any of C1-C6, further comprising: receiving, from a node (e.g., gNB), a time domain resource allocation list via RRC, wherein the additional, non-consecutive uplink slots are indicated by a DCI bit pointing to one or more entry index of the list.

D1. A method performed in a node (e.g., gNB), comprising: sending, to a UE, an initial configured grant comprising at least one uplink slot; and after sending the initial configured grant, sending a dynamic grant that allocates a plurality of additional uplink slots to the UE, wherein at least two of the plurality of additional uplink slots are non-consecutive slots.

D2. The method of D1, wherein the initial configured grant is insufficient for uplink transmission from the UE (e.g., due to variable file size).

D3. The method of D1 or D2, further comprising: receiving data from the UE on at least one uplink slot of the configured grant and at least one of the additional uplink slots of the dynamic grant.

D4. The method of D3, wherein the total size of the data transmitted on the uplink slots of the configured grant and the additional slots of the dynamic grant is greater than a size indicated by a buffer status report from the UE corresponding to the initial configured grant.

D5. The method of any of D1-D4, wherein sending the dynamic grant comprises sending a single dynamic grant that provides fast slot allocation for non-consecutive slots.

D6. The method of any of D1-D5, wherein the additional uplink slots are indicated by a DCI information bit transmitted on Physical Downlink Control Channel (PDCCH).

D7. The method of D6, wherein the DCI indicates an entry in an extend resource allocation table.

D8. The method of D6, wherein the format of the DCI comprises a time allocation bit map.

D9. The method of any of D1-D6, further comprising: sending the UE a time domain resource allocation list via RRC, wherein the additional, non-consecutive uplink slots are indicated by a DCI bit pointing to one or more entry index of the list.

E1. A method performed in a UE, comprising: receiving an activation for a configured grant (e.g., an allocation of periodic uplink slots), wherein the activation is valid for a specified time window; and deactivating (e.g., ceasing) the configured grant once the specified time window is passed (e.g., expired).

E2. The method of E1, wherein one or more of the configured grant and duration of the time window are defined by a configuration received from a node.

E3. The method of E1 or E2, further comprising: receiving an activation for a second configured grant, wherein the second configured grant remains valid until a deactivation signal is received from a node (e.g., it does not have a corresponding time window, or is configured with infinite size time window).

E4. The method of any of E1-E3, wherein the activated configured grant is one of multiple configured grants for the UE.

E5. The method of E4, wherein multiple configured grants for the UE are activated by a single DCI.

F1. A method performed in a node (e.g., gNB), comprising: configuring a UE for one or more configured grants, wherein the configuring comprises specifying a time window for at least one of the configured grants; and sending an activation for the configured grant (e.g., an allocation of periodic uplink slots), wherein the activation is valid for the specified time window.

F2. The method of F1, wherein no transmissions are received from the UE on the configured grant after the specified time window passes.

F3. The method of F1 or F2, further comprising: sending an activation for a second configured grant, wherein the second configured grant remains valid until a deactivation signal is sent (e.g., it does not have a corresponding time window, or is configured with infinite size time window).

F4. The method of any of F1-F3, wherein the activated configured grant is one of multiple configured grants for the UE.

F5. The method of E4, wherein sent activation is a single DCI that activates multiple configured grants for the UE.

G1. A method performed in a UE, comprising: receiving a deactivation for a configured grant (e.g., an allocation of periodic uplink slots), wherein the deactivation is valid for a specified time window; and reactivating the configured grant once the specified time window is passed (e.g., expired).

G2. The method of G1, wherein one or more of the configured grant and duration of the time window are defined by a configuration received from a node.

H1. A method performed in a node (e.g., gNB), comprising: configuring a UE for one or more configured grants, wherein the configuring comprises specifying a time window for at least one of the configured grants; and sending an deactivation for the configured grant (e.g., an allocation of periodic uplink slots), wherein the deactivation is valid for the specified time window.

H2. The method of H1, wherein one or more transmissions are received from the UE on the configured grant after the specified time window passes.

H3. The method of H1 or H2, further comprising: sending an deactivation for a second configured grant, wherein the second configured grant remains deactivated until an activation signal is sent (e.g., it does not have a corresponding time window, or is configured with infinite size time window).

I1. A method performed in a UE, comprising: receiving, from a node (e.g., gNB), a time domain resource allocation list comprising a plurality of entries; receiving an indication (e.g., DCI) identifying one or more entries in the list; and activating a configured grant having at least two uplink allocations (e.g., PUSCH allocations) in the period of the configured grant based on the received indication.

I2. The method of I1, further comprising: receiving a first parameter indicating the number of consecutive slots allocated within the configured grant period and a second parameter indicating the number of consecutive allocations (e.g., PUSCH allocations) within a slot.

I3. The method of I2, wherein the first parameter is cg-nrofSlots-r16 and the second parameter is cg-nrof-PUSCH-InSlot-r16.

I4. The method of any of I1-I3, further comprising deriving, based on the list and the indication, how many PUSCHs are scheduled, and the specific allocation for each PUSCH.

I5. The method of any of I1-I4, wherein the list comprises a first subset of entries used to schedule single-PUSCH and a second subset of entries used to schedule multi-PUSCH.

I6. The method of I5, wherein the received indication identifies an entry in the first subset, wherein a first PUSCH allocation in the multi-PUSCH configured grant indicated by the DCI is defined by the entry in the first subset, and wherein remaining PUSCH allocations in the slot of the first PUSCH allocation have the same length and PUSCH mapping type as in the first PUSCH allocation, and are appended following the previous allocations without any gaps.

I7. The method of I6, wherein the same combination of start symbol and length and PUSCH mapping type repeats over the consecutively allocated slots.

I8. The method of any of I1-I5, wherein the received indication identifies a multi-PUSCH entry in the list.

I9. The method of I8, further comprising: selecting one PUSCH allocation from among the multiple PUSCH allocations in the indicated entry and using it as a first PUSCH allocation in the multi-PUSCH configured grant period.

I10. The method of I9, wherein the selected PUSCH allocation is the first PUSCH allocation of the multi-PUSCH entry.

I11. The method of I9 or I10, wherein remaining PUSCH allocations in the slot of the first PUSCH allocation have the same length and PUSCH mapping type as in the first PUSCH allocation, and are appended following the previous allocations without any gap, and wherein the same combination of start symbol and length and PUSCH mapping type repeats over the consecutively allocated slots.

I12. The method of any of I1-I5, wherein the received indication (or entry identified by the indication) directly provides information regarding which slot(s) are allocated within a configured grant period and which symbol(s) are allocated within a slot.

I13. The method of I12, wherein the received indication overrides a configuration provided by one or more higher layer parameters (e.g., cg-nrofSlots-r16 and cg-nrofPUSCH-InSlot-r16).

J1. A method performed in a node, comprising: sending a UE a time domain resource allocation list comprising a plurality of entries; and sending an indication (e.g., DCI) identifying one or more entries in the list, wherein the DCI activates a configured grant having at least two uplink allocations (e.g., PUSCH allocations) in the period of the configured grant based on the indication.

J2. The method of J1, further comprising: sending a first parameter indicating the number of consecutive slots allocated within the configured grant period and a second parameter indicating the number of consecutive allocations (e.g., PUSCH allocations) within a slot.

J3. The method of J2, wherein the first parameter is cg-nrofSlots-r16 and the second parameter is cg-nrof-PUSCH-InSlot-r16.

J4. The method of any of J1-J3, wherein the list comprises a first subset of entries for single-PUSCH and a second subset of entries for multi-PUSCH.

J5. The method of J4, wherein the indication identifies an entry in the first subset, wherein a first PUSCH allocation in the multi-PUSCH configured grant indicated by the DCI is defined by the entry in the first subset, and wherein remaining PUSCH allocations in the slot of the first PUSCH allocation have the same length and PUSCH mapping type as in the first PUSCH allocation, and are appended following the previous allocations without any gaps.

J6. The method of J5, wherein the same combination of start symbol and length and PUSCH mapping type repeats over the consecutively allocated slots.

J7. The method of any of J1-J4, wherein the indication identifies a multi-PUSCH entry in the list, wherein the indication causes the UE to select one PUSCH allocation from among the multiple PUSCH allocations in the indicated entry and use it as a first PUSCH allocation in the multi-PUSCH configured grant period, and wherein the selected PUSCH allocation is the first PUSCH allocation of the multi-PUSCH entry.

J8. The method of J7, wherein remaining PUSCH allocations in the slot of the first PUSCH allocation have the same length and PUSCH mapping type as in the first PUSCH allocation, and are appended following the previous allocations without any gap, and wherein the same combination of start symbol and length and PUSCH mapping type repeats over the consecutively allocated slots.

J9. The method of any of J1-J4, wherein the indication (or entry identified by the indication) directly provides information regarding which slot(s) are allocated within a configured grant period and which symbol(s) are allocated within a slot.

J10. The method of J9, wherein the indication overrides a configuration previously provided by the node for one or more higher layer parameters (e.g., cg-nrofSlots-r16 and cg-nrofPUSCH-InSlot-r16).

K1. A network node (e.g., gNB) adapted to perform any of B, D, F, H, and J.

L1. A UE adapted to perform any of claims A, C, E, G, and I.

M1. A computer program comprising instructions that when executed by processing circuitry of an apparatus causes the apparatus to perform the method of any one of A-J.

M2. A carrier containing the computer program of M1, wherein the carrier is one of an electronic signal, an optical signal, a radio signal, and a computer readable storage medium.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc. It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to", "adapted to", "capable of" or "operative to".

It should also be emphasized that the steps of the methods may, without departing from the embodiments herein, be performed in another order than the order in which they appear herein.

The invention claimed is:

1. A method performed in a user equipment, UE, the method comprising:
   receiving a configuration for a dynamically adaptable uplink resource allocation, the configuration comprising at least an initial configured grant for uplink transmission on periodic transmission resources comprising at least one uplink slot; and
   transmitting first or new data on at least one uplink slot of the initial configured grant,
   wherein the dynamically adaptable uplink resource allocation to the UE is dynamically adaptable based at least in part on the initial configured grant being insufficient for an uplink transmission or the actual data size for transmission being smaller than the initial configured grant and the UE providing an indication to a network node whether all of the uplink resource allocation is needed for the uplink transmission or whether the resource allocation is insufficient for the uplink transmission.

2. The method of claim 1, wherein the dynamically adaptable uplink resource allocation comprises receiving one or more of:

a dynamic activation of at least a second configured grant; or a dynamic grant that allocates a plurality of additional uplink slots, wherein at least two of the plurality of additional uplink slots are non-consecutive slots.

3. The method of claim 2, wherein the received dynamic activation or dynamic grant is valid for a specified time window and:

at least one of the second configured grant or allocation of additional uplink slots is deactivated once the specified time window is passed.

4. The method of claim 2, wherein the second configured grant is one of multiple configured grants for the UE which are activated by a single Downlink Control Information, DCI and wherein either the DCI indicates an entry in an extended resource allocation table or the format of the DCI comprises a time allocation bit map.

5. The method of claim 2, wherein the dynamic activation of at least a second configured grant or dynamic grant that allocates a plurality of additional uplink slots is in response to the indication indicating that the initial configured grant is insufficient, and transmitting data on at least one uplink slot of the second configured grant or the non-consecutive slots, wherein the total size of the data transmitted on the uplink slots of the initial configured grant and the additional slots of the second configured grant or the non-consecutive slots is greater than a size indicated by a buffer status report corresponding to the initial configured grant.

6. The method of claim 5, wherein the indication is a buffer status report, BSR, or dedicated information bit.

7. The method of claim 2, wherein receiving the dynamic grant comprises receiving a single dynamic grant that provides fast slot allocation for non-consecutive slots and/or wherein the additional uplink slots are indicated by a DCI information bit received on a Physical Downlink Control Channel, PDCCH.

8. The method of claim 2, wherein receiving the configuration comprises receiving, from the network node, a time domain resource allocation list via Radio Resource Control, RRC, and wherein additional, non-consecutive uplink slots are indicated by a DCI bit pointing to one or more entry index of the list.

9. The method of claim 1, wherein when the actual data size is smaller than the initial configured granted resource amount at a configured grant occasion, the indication whether all of the uplink resource allocation is needed for the uplink transmission further comprising:

signaling an indication to the network node that the rest of the resource will not be used.

10. The method of claim 9, further comprising:
the UE starting a transmission timer.

11. The method of claim 10, further comprising:
receiving from the network node a value for the duration of the timer; and
transmitting new data on a second uplink slot of the configured grant before expiration of the timer.

12. The method of claim 9, wherein the indication comprises a padding bit in an uplink transmission in accordance with the initial configured grant.

13. The method of claim 12, wherein the padding bit indicates that the UE will initiate a timer for ceasing use of the resources, or that the UE will immediately cease use of the resources.

14. The method of claim 9, further comprising:
deactivating at least a part of the initial configured grant during a specified time window; and
reactivating the at least a part of the initial configured grant after the time window has passed.

15. The method of claim 1, comprising:
receiving, from a node, a time domain resource allocation list comprising a plurality of entries;
receiving an indication identifying one or more entries in the list;
activating a configured grant having at least two uplink allocations in the period of the configured grant based on the received indication;
receiving a first parameter indicating the number of consecutive slots allocated within the configured grant period and a second parameter indicating the number of consecutive allocations within a slot, wherein the first parameter is cg-nrofSlots-r16 and the second parameter is cg-nrofPUSCH-InSlot-r16; and
deriving, based on the list and the indication, how many PUSCHs are scheduled, and the specific allocation for each PUSCH, wherein the list comprises a first subset of entries used to schedule single-PUSCH and a second subset of entries used to schedule multi-PUSCH, wherein the received indication identifies an entry in the first subset,
wherein a first PUSCH allocation in the multi-PUSCH configured grant indicated is defined by the entry in the first subset,
wherein remaining PUSCH allocations in the slot of the first PUSCH allocation have the same length and PUSCH mapping type as in the first PUSCH allocation, and are appended following the previous allocations without any gaps, and
wherein the same combination of start symbol and length and PUSCH mapping type repeats over the consecutively allocated slots.

16. A UE configured to:
receive a configuration for a dynamically adaptable uplink resource allocation, the configuration comprising at least an initial configured grant for uplink transmission on periodic transmission resources comprising at least one uplink slot; and
transmit first or new data on at least one uplink slot of the initial configured grant,
wherein the dynamically adaptable uplink resource allocation to the UE is dynamically adaptable based at least in part on the initial configured grant being insufficient for uplink transmission or the actual data size for transmission being smaller than the initial configured grant and the UE providing an indication to a network node whether all of the uplink resource allocation is needed for the uplink transmission or whether the resource allocation is insufficient for the uplink transmission.

17. A method performed by a radio access network node, the method comprising:
configuring a UE for a dynamically adaptable uplink resource allocation, the configuration comprising at least an initial configured grant for uplink transmission on periodic transmission resources comprising at least one uplink slot; and
receiving first or new data from the UE on at least one uplink slot of the initial configured grant,
wherein the dynamically adaptable uplink resource allocation to the UE is dynamically adaptable based at least in part on the initial configured grant being insufficient for uplink transmission or the actual data size for transmission being smaller than the initial configured grant and the UE provides an indication whether all of the uplink resource allocation is needed for the uplink transmission or whether the resource allocation is insufficient for the uplink transmission.

18. The method of claim 17, wherein the dynamically adaptable uplink resource allocation comprises signaling one or more of:
a dynamic activation of at least a second configured grant; or
a dynamic grant that allocates a plurality of additional uplink slots, wherein at least two of the plurality of additional uplink slots are non-consecutive slots.

19. The method of claim 18, wherein the second configured grant is one of multiple configured grants for the UE activated by a single Downlink Control Information, DCI, from the network node and wherein either the DCI indicates an entry in an extended resource allocation table or the format of the DCI comprises a time allocation bit map.

20. The method of claim 18, wherein the dynamic activation of at least a second configured grant or signaling a dynamic grant that allocates a plurality of additional uplink slots is in response to the indication indicating that the initial configured grant is insufficient.

21. The method of claim 18,
wherein the configuring comprises sending a time domain resource allocation list, comprising a plurality of entries, via Radio Resource Control, RRC, and
wherein additional, non-consecutive uplink slots are indicated by a DCI bit pointing to one or more entry index of the list, where the indication activates a configured grant having at least two uplink allocations in the period of the configured grant.

22. The method of claim 17, wherein the indication whether all of the uplink resource allocation is needed for the uplink transmission further comprising:
receiving an indication from the UE that the rest of the resource will not be used.

23. The method of claim 22, wherein the indicator indicates that the UE will initiate a timer for ceasing use of the resources, or that the UE will immediately cease use of the resources.

24. The method of claim 23, further comprising:
sending the UE a value for the duration of the timer.

25. The method of claim 22, further comprising:
initiating a resource reuse estimation for at least one unused uplink slot of the configured grant.

26. A radio access network node configured to:
configure a UE for a dynamically adaptable uplink resource allocation, the configuration comprising at least an initial configured grant for uplink transmission on periodic transmission resources comprising at least one uplink slot; and
receive first or new data from the UE on at least one uplink slot of the initial configured grant,
wherein the dynamically adaptable uplink resource allocation to the UE is dynamically adaptable based at least in part on the initial configured grant being insufficient for uplink transmission or the actual data size for transmission being smaller than the initial configured grant and the UE provides an indication whether all of the uplink resource allocation is needed for the uplink transmission or whether the resource allocation is insufficient for the uplink transmission.

27. A computer program product comprising a non-transitory computer readable medium storing instructions which when performed by processing circuitry of UE or network node causes the UE or network node to perform claim 1.

* * * * *